(12) United States Patent
Trainor et al.

(10) Patent No.: US 10,359,771 B2
(45) Date of Patent: Jul. 23, 2019

(54) PREDICTION OF FALSE ALARMS IN SENSOR-BASED SECURITY SYSTEMS

(71) Applicant: Tyco Fire & Security GmbH, Neuhausen am Rheinfall (CH)

(72) Inventors: Christine Trainor, Boca Raton, FL (US); Gopi Subramanian, Bangalore (IN); David Vavrasek, Westfield, NJ (US)

(73) Assignee: Tyco Fire & Security GmbH, Neuhausen am Rheinfall ( * ) Notice: Subject to any disclaimer, the term of this patent is extended or adjusted under 35 U.S.C. 154(b) by 0 days.

(21) Appl. No.: 15/617,259

(22) Filed: Jun. 8, 2017

(65) Prior Publication Data

US 2018/0356809 A1    Dec. 13, 2018

(51) Int. Cl.
*G05B 23/02* (2006.01)
*H04W 84/18* (2009.01)
(Continued)

(52) U.S. Cl.
CPC ..... *G05B 23/0229* (2013.01); *G05B 23/0283* (2013.01); *G06F 16/00* (2019.01);
(Continued)

(58) Field of Classification Search
CPC ...... G05B 23/0229–0283; G05B 23/00; G05B 25/08; G05B 23/0221–0283; G05B 19/042; G05B 19/4093; G05B 15/02; G06F 17/30; G06F 16/00; H04W 84/18; G06Q 40/08; G06N 99/005; G06N 5/04; G08B 23/00; G08B 25/08; G08B 29/04; G08B 29/25; G08B 29/185
See application file for complete search history.

(56) References Cited

U.S. PATENT DOCUMENTS 5,453,733 A    9/1995  Peterson et al.
5,587,704 A   12/1996  Foster
(Continued)

FOREIGN PATENT DOCUMENTS

EP    2 843 636 A1    3/2015

OTHER PUBLICATIONS

U.S. Appl. No. 15/173,775, filed Jun. 6, 2016, entitled "Predicting Service for Intrusion and Alarm Systems Based on Signal Activity Patterns", Jason Kapuschat et al.
(Continued)

*Primary Examiner* — Orlando Bousono
(74) *Attorney, Agent, or Firm* — Foley & Lardner LLP

(57) ABSTRACT

Techniques for detecting changes in operational characteristics of a group of sensor devices are described. The techniques collect sensor information from plural sensor devices deployed in a system, with the collected sensor information including sensor data and sensor device metadata. The techniques continually analyze the collected sensor information to detect changes in the operational characteristics of a sensor device in the group of sensor devices. Upon detection of changes in the operational characteristics of the sensor, a database that stores maintenance organization contact information is accessed and a request is generated for maintenance on the sensor device, which request is sent to the maintenance organization.

20 Claims, 13 Drawing Sheets

(51) Int. Cl.
  *G06F 16/00* (2019.01)
  *G08B 29/04* (2006.01)
  *G08B 29/14* (2006.01)
  *G08B 29/18* (2006.01)
(52) U.S. Cl.
  CPC ............ *G08B 29/04* (2013.01); *G08B 29/14* (2013.01); *G08B 29/185* (2013.01); *H04W 84/18* (2013.01)

(56) References Cited

U.S. PATENT DOCUMENTS

| | | | |
|---|---|---|---|
| 5,708,423 A | 1/1998 | Ghaffari et al. | |
| 5,825,283 A | 10/1998 | Camhi | |
| 5,862,201 A | 1/1999 | Sands | |
| 8,650,048 B1 | 2/2014 | Hopkins, III et al. | |
| 9,996,078 B1* | 6/2018 | Wu | G05B 23/0221 |
| 2001/0039525 A1 | 11/2001 | Messmer et al. | |
| 2003/0083756 A1* | 5/2003 | Hsiung | G05B 15/02 700/28 |
| 2003/0109951 A1* | 6/2003 | Hsiung | G05B 15/02 700/108 |
| 2003/0117279 A1 | 6/2003 | Ueno et al. | |
| 2003/0136135 A1* | 7/2003 | Kim | F25D 29/00 62/125 |
| 2003/0144746 A1* | 7/2003 | Hsiung | G05B 15/02 700/28 |
| 2003/0144932 A1 | 7/2003 | Martin et al. | |
| 2005/0055249 A1 | 3/2005 | Helitzer et al. | |
| 2005/0110637 A1 | 5/2005 | Rao | |
| 2006/0033625 A1 | 2/2006 | Johnson et al. | |
| 2006/0195569 A1 | 8/2006 | Barker et al. | |
| 2006/0287783 A1 | 12/2006 | Walker | |
| 2007/0142936 A1 | 6/2007 | Denison et al. | |
| 2007/0282773 A1 | 12/2007 | Harrison et al. | |
| 2008/0103751 A1* | 5/2008 | Hsiung | G05B 15/02 703/20 |
| 2009/0022362 A1 | 1/2009 | Gagvani et al. | |
| 2009/0265193 A1 | 10/2009 | Collins et al. | |
| 2009/0279734 A1 | 11/2009 | Brown | |
| 2010/0134285 A1 | 6/2010 | Holmquist | |
| 2010/0153140 A1 | 6/2010 | Helitzer et al. | |
| 2010/0174566 A1 | 7/2010 | Helitzer et al. | |
| 2010/0183160 A1 | 7/2010 | Cosgrove et al. | |
| 2012/0226652 A1 | 9/2012 | Gupta | |
| 2013/0006676 A1 | 1/2013 | Helitzer et al. | |
| 2013/0091213 A1 | 4/2013 | Diab et al. | |
| 2013/0201316 A1 | 8/2013 | Binder et al. | |
| 2013/0335219 A1 | 12/2013 | Malkowski | |
| 2014/0005509 A1 | 1/2014 | Bhavaraju et al. | |
| 2014/0006060 A1 | 1/2014 | Sehnal et al. | |
| 2014/0132409 A1 | 5/2014 | Billman et al. | |
| 2014/0149416 A1 | 5/2014 | Wallace | |
| 2014/0247137 A1 | 9/2014 | Proud et al. | |
| 2014/0277718 A1 | 9/2014 | Izhikevich et al. | |
| 2014/0279707 A1* | 9/2014 | Joshua | G06Q 30/0283 705/400 |
| 2015/0022357 A1 | 1/2015 | Gettings et al. | |
| 2015/0025917 A1 | 1/2015 | Stempora | |
| 2015/0077737 A1 | 3/2015 | Belinsky et al. | |
| 2015/0163121 A1* | 6/2015 | Mahaffey | G06F 11/0766 707/687 |
| 2015/0254330 A1* | 9/2015 | Chan | G06F 17/30598 707/613 |
| 2015/0254972 A1* | 9/2015 | Patterson | G08B 29/185 340/545.1 |
| 2017/0004226 A1* | 1/2017 | Skoglund | G06F 17/18 |
| 2017/0006135 A1* | 1/2017 | Siebel | H04L 67/02 |
| 2017/0061783 A1 | 3/2017 | Nalukurthy et al. | |
| 2017/0091867 A1 | 3/2017 | Trainor et al. | |
| 2017/0091868 A1 | 3/2017 | Trainor et al. | |
| 2017/0091869 A1 | 3/2017 | Trainor et al. | |
| 2017/0091870 A1 | 3/2017 | Trainor et al. | |
| 2017/0091871 A1 | 3/2017 | Trainor et al. | |
| 2017/0092108 A1 | 3/2017 | Trainor et al. | |
| 2017/0094376 A1 | 3/2017 | Trainor et al. | |
| 2017/0153914 A1* | 6/2017 | Rausch | G06F 9/4843 |
| 2017/0228661 A1* | 8/2017 | Chien | G06N 99/005 |

OTHER PUBLICATIONS

International Search Report & Written Opinion, PCT/US2015/019381, dated Jun. 19, 2015.
International Search Report & Written Opinion, PCT/US2016/054310, dated Dec. 15, 2016.
International Search Report & Written Opinion, PCT/US2016/054320, dated Dec. 19, 2016.
International Search Report & Written Opinion, PCT/US2016/054317, dated Dec. 19, 2016.
International Search Report & Written Opinion, PCT/US2016/054324, dated Dec. 29, 2016.
International Search Report & Written Opinion, PCT/US2016/054311, dated Dec. 13, 2016.
International Search Report & Written Opinion, PCT/US2016/054312, dated Dec. 9, 2016.
International Search Report and Written Opinion for International Application No. PCT/US2018/036699, dated Oct. 16, 2018, 17 pages.

* cited by examiner

PREDICTION OF FALSE ALARMS IN SENSOR-BASED SECURITY SYSTEMS

BACKGROUND

This description relates to operation of sensor networks such as those used for security, intrusion and alarm systems installed on industrial or commercial or residential premises.

It is common for businesses to have various types of systems such as intrusion detection, fire detection and surveillance systems for detecting various alarm conditions at their premises and signaling the conditions to a monitoring station or authorized users. Other systems that are commonly found in businesses are access control systems have card readers and access controllers to control access, e.g., open or unlock doors, etc. These systems use various types of sensors such as motion detectors, cameras, and proximity sensors, thermal, optical, vibration sensors and so forth.

Some of the sensors used in these systems are relatively simple and inexpensive, whereas others in comparison are relatively complex and expensive. Each of these sensor types can be prone to failures of various types. One particular failure type is when a sensor gives a false positive, that is, a false indication of a condition that could result in assert of an alarm condition. Those types of sensor failures can be significant sources of false alarms that can cost alarm monitoring companies, building owners, security professionals and police departments significant amounts of money and wasted time that would otherwise be spent on real intrusion situations.

SUMMARY

According to an aspect, a computer program product tangibly stored on a computer readable hardware storage device includes instructions to cause a processor to collect sensor information from plural sensor devices deployed in a system, with the collected sensor information including sensor data and sensor device metadata, continually analyze the collected sensor information to detect changes in the operational characteristics of a sensor device in the group of sensor devices; upon detection of a change in the operational characteristics of the sensor, access a database that stores maintenance organization contact information, generate based on the detected changes and the access to the database a request for maintenance on the sensor device, and send the request to the maintenance organization contact.

Aspects also include systems and methods.

The aspects can include one or more of the following advantages.

Techniques are provided that predict conditions that are one or more precursors to a false alarm condition caused by an imminent malfunction of security products especially sensors used in security products. The techniques determine when a sensor is likely to fail over a time period or will require maintenance over that time period. By attending to these in a closed-loop notification manner, the techniques may minimize production of spurious data that falsely indicate an alarm condition. For example, a smoke detector may indicate the presence of smoke in the building when it is simply an accumulation of dust on the device. Likewise, a contact switch on a warehouse door may indicate that the door has been opened when, in fact, the magnetic switch has simply stopped working correctly. Such "false alarm" situations caused these numerous and costly incidents of sensor malfunction can result in better and more reliable system performance at lower costs to both building owners, security agency costs, and maintenance personnel. In addition, the purported cause of a potential false alarm condition can be used to identify similar conditions existing at the premises or over a group of related or unrelated premises, all of which can be repaired during a single maintenance visit, and thus avoid other related problems that may exist with the systems that were not initially detected.

The details of one or more embodiments of the invention are set forth in the accompanying drawings and the description below. Other features, objects, and advantages of the invention is apparent from the description and drawings, and from the claims.

DETAILED DESCRIPTION

Described herein are surveillance/intrusion/fire/access systems that are wirelessly connected to a variety of sensors. In some instances, those systems may be wired to sensors. Examples of detectors/sensors 28 (sensor detectors used interchangeably) include motion detectors, glass break detectors, noxious gas sensors, smoke/fire detectors, contact/proximity switches, video sensors, such as camera, audio sensors such as microphones, directional microphones, temperature sensors such as infrared sensors, vibration sensors, air movement/pressure sensors, chemical/electro-chemical sensors, e.g., VOC (volatile organic compound) detectors. In some instances, those systems sensors may include weight sensors, LIDAR (technology that measures distance by illuminating a target with a laser and analyzing the reflected light), GPS (global positioning system) receivers, optical, biometric sensors, e.g., retina scan sensors, EGG/Heartbeat sensors in wearable computing garments, network hotspots and other network devices, and others.

The surveillance/intrusion/fire/access systems employ wireless sensor networks and wireless devices, with remote, cloud-based server monitoring and report generation. As described in more detail below, the wireless sensor networks wireless links between sensors and servers, with the wireless links usually used for the lowest level connections (e.g., sensor node device to hub/gateway).

In the network, the edge (wirelessly-connected) tier of the network is comprised sensor devices that provide specific sensor functions. These sensor devices have a processor and memory, and may be battery operated and include a wireless network card. The edge devices generally form a single wireless network in which each end-node communicates directly with its parent node in a hub-and-spoke-style architecture. The parent node may be, e.g., a network access point (not to be confused with an access control device or system) on a gateway or a sub-coordinator which is, in turn is connected to the access point or another sub-coordinator.

Figure 1:
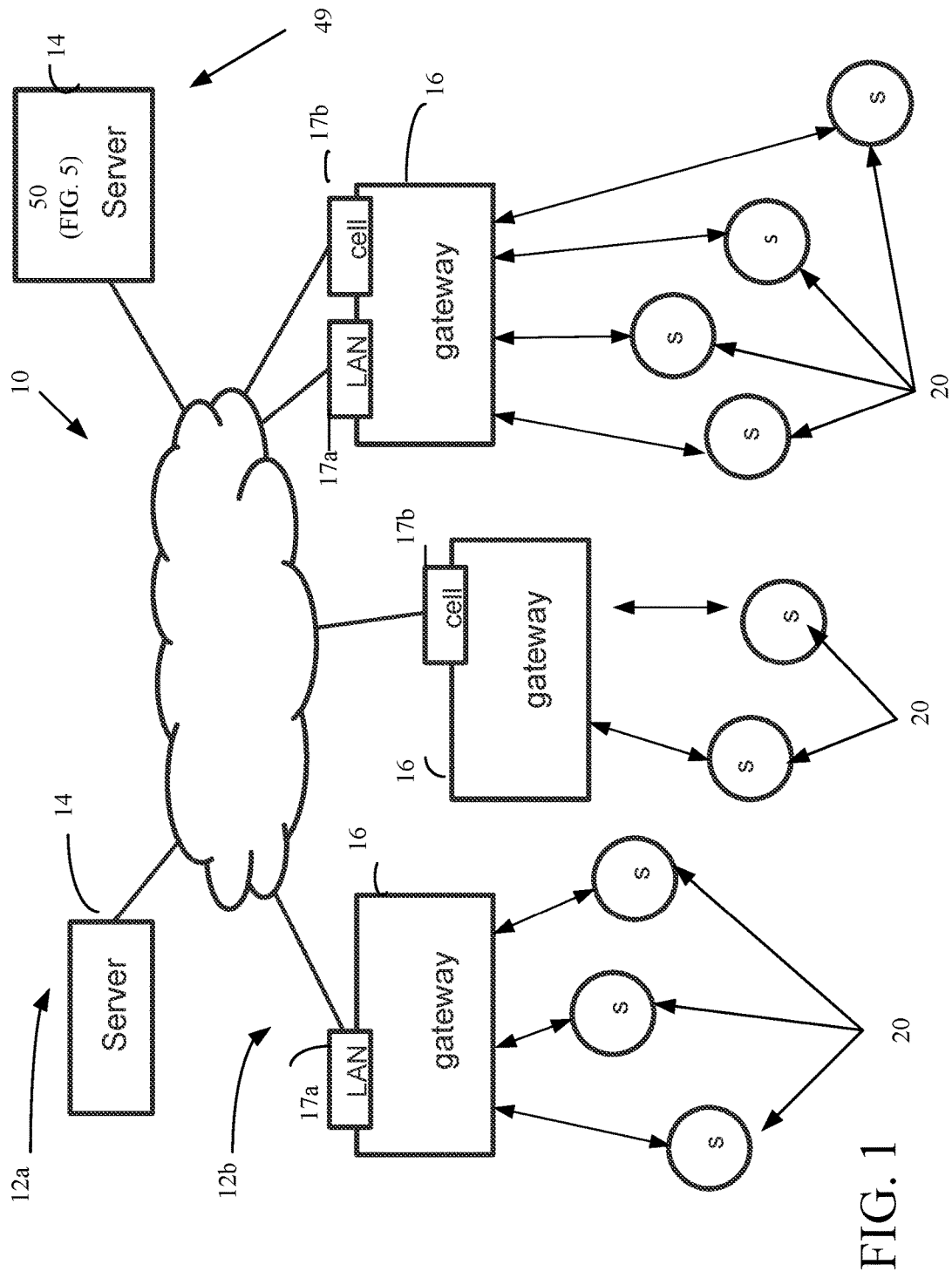
FIG. 1 is a schematic diagram of an exemplary networked security system.

Referring now to FIG. 1, an exemplary (global) distributed network topology for a wireless sensor network 10 is shown. In FIG. 1 the wireless sensor network 10 is a distributed network that is logically divided into a set of tiers or hierarchical levels 12a-12c. In an upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 10 has direct links between devices (nodes) as shown and discussed below.

In one implementation hierarchical level 12a includes a central monitoring station 49 comprised of one or more of the server computers 14 and which includes or receives information from a sensor based state prediction system 50 as will be described below.

The distributed network 10 includes a second logically divided tier or hierarchical level 12b, referred to here as a middle tier that involves gateways 16 located at central, convenient places inside individual buildings and structures. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F"), as well as wireless sensor nodes or sensor end-nodes 20 (marked in the FIG. 1 with "C"). In some embodiments wired sensors (not shown) can be included in aspects of the distributed network 10.

In a typical network, the edge (wirelessly-connected) tier of the network is largely comprised of devices with specific functions. These devices have a small-to-moderate amount of processing power and memory, and often are battery powered, thus requiring that they conserve energy by spending much of their time in sleep mode. A typical model is one where the edge devices generally form a single wireless network in which each end-node communicates directly with its parent node in a hub-and-spoke-style architecture. The parent node may be, e.g., an access point on a gateway or a sub-coordinator which is, in turn, connected to the access point or another sub-coordinator.

Each gateway is equipped with an access point (fully functional sensor node or "F" sensor node) that is physically attached to that access point and that provides a wireless connection point to other nodes in the wireless network. The links (illustrated by lines not numbered) shown in FIG. 1 represent direct (single-hop MAC layer) connections between devices. A formal networking layer (that functions in each of the three tiers shown in FIG. 1) uses a series of these direct links together with routing devices to send messages (fragmented or non-fragmented) from one device to another over the network.

Figure 2B:
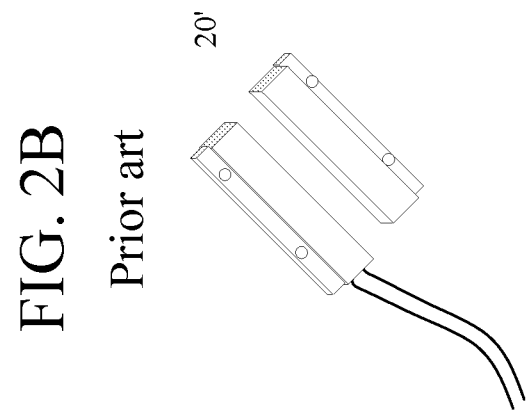
FIGS. 2A, 2B are diagrams of a complex sensor device and simple sensor device, respectively.
Figure 2A:
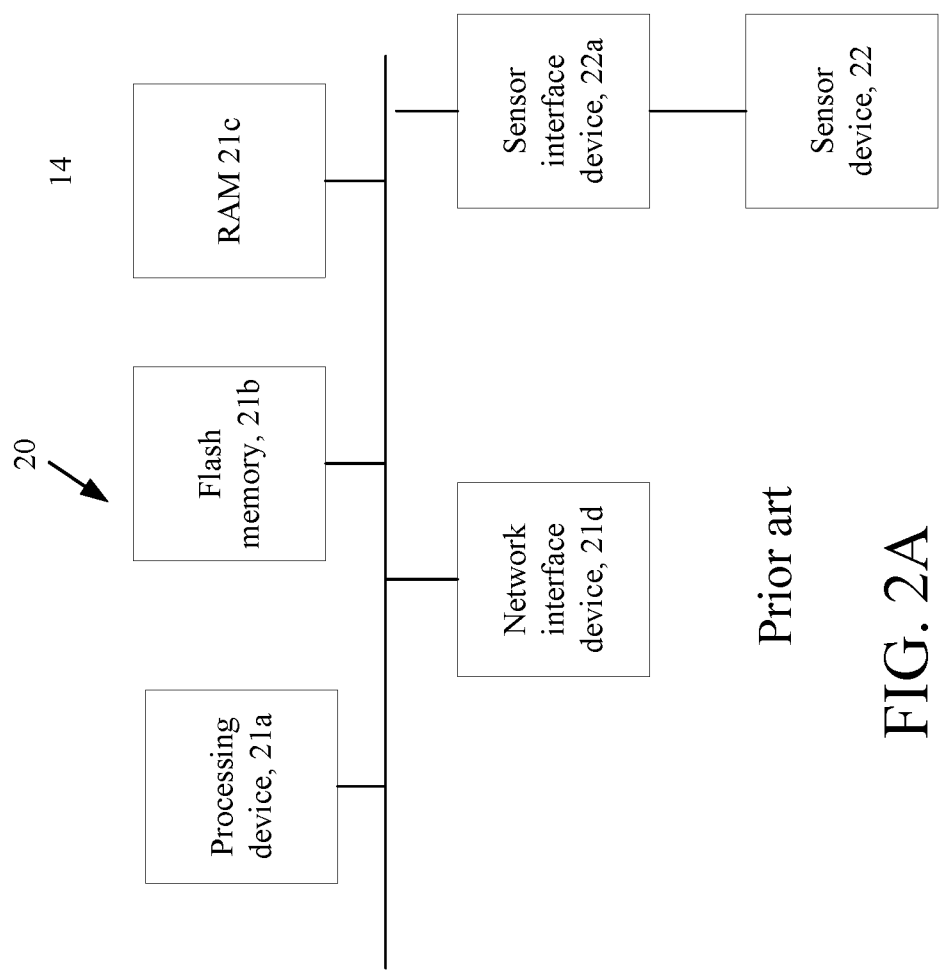

Referring to FIG. 2A, one type of a sensor device 20 (an example of a complex sensor) is shown. Sensor device 20 includes a processor device 21a, e.g., a CPU and or other type of controller device that executes under an operating system, generally with 8-bit or 16-bit logic, rather than the 32 and 64-bit logic used by high-end computers and microprocessors. The device 20 has a relatively small flash/persistent store 21b and volatile memory 21c in comparison with other the computing devices on the network. Generally, the persistent store 21b is about a megabyte of storage or less and volatile memory 21c is about several kilobytes of RAM memory or less. The device 20 has a network interface card 21d that interfaces the device 20 to the network 10. Typically, a wireless interface card is used, but in some instances a wired interface could be used. Alternatively, a transceiver chip driven by a wireless network protocol stack (e.g., 802.15.4/6LoWPAN) can be used as the (wireless) network interface. These components are coupled together via a bus structure. The device 20 also includes a sensor element 22 and a sensor interface 22a that interfaces to the processor 21a. Sensor 22 can be any type of sensor types mentioned above.

Referring to FIG. 2B, another type of a sensor device 20' is a simple sensor element that is hardwired to a panel or another device that conveys sensor signals to a panel or system. One example of such this type of sensor is a magnetic, door/window sensor switch, that simply has for instance a Reed switch and magnet. Normally, the Reed switch in an open state and closes to form a circuit when the Reed switch comes within a certain proximity to the magnet.

In any event, complex 20 and/or simple sensors 20' are deployed throughout a premises and at any time are subject to failure or erratic behavior.

Figure 3:
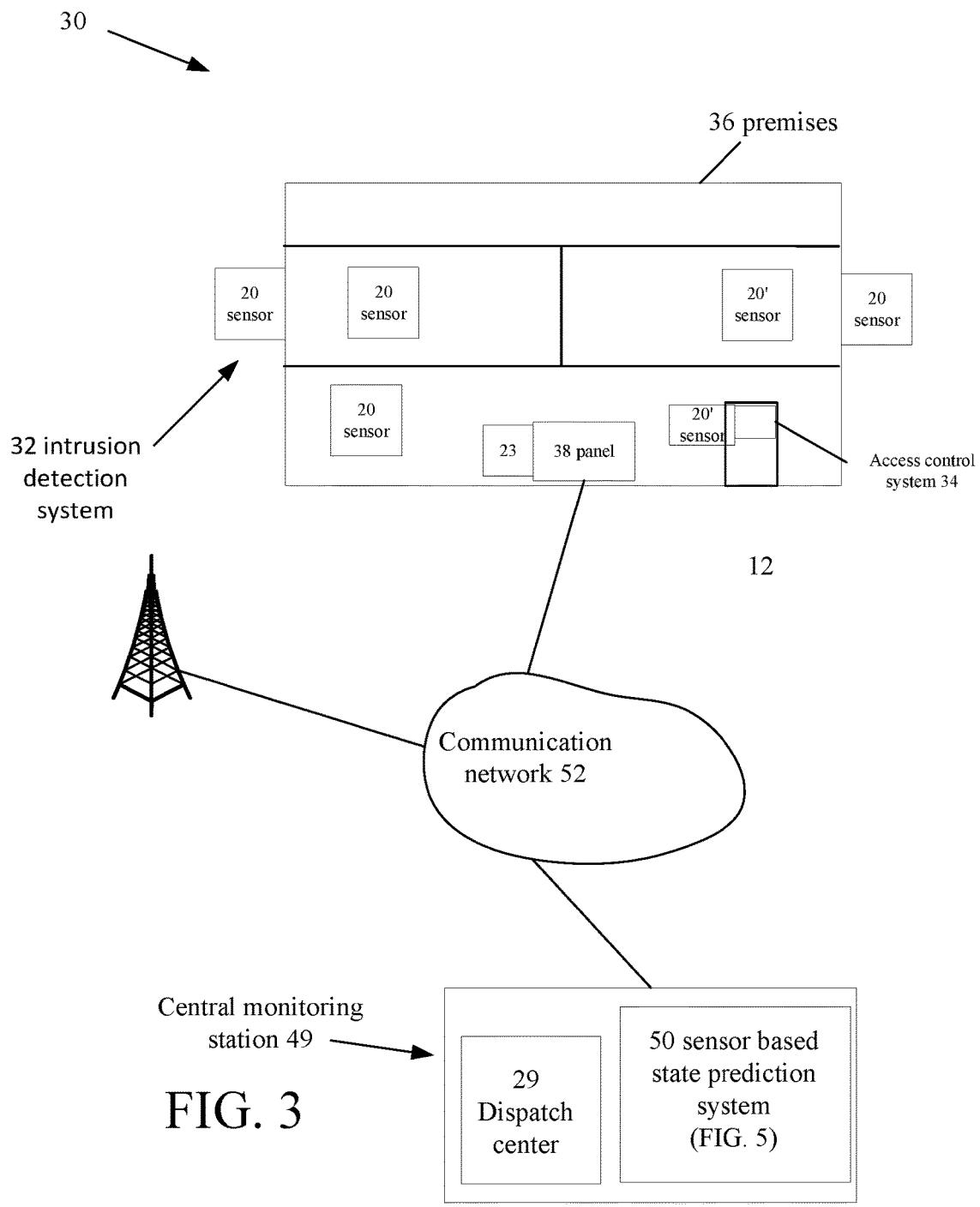
FIG. 3 is a schematic diagram of an example security system at premises.

Referring now to FIG. 3, an example application 30 of a security system in particular an intrusion detection system 32 and access control system 34 installed at a premises 36 is shown. In this example, the premises 36 is a commercial premises, but the premises may alternatively be any type of premises or building, e.g., industrial, etc. The intrusion detection system 32 includes a panel, such as an intrusion detection panel 38 and sensors/detectors 20, 20' (FIGS. 1, 2A, 2B) disbursed throughout the premises 36. The intrusion detection system 32 is in communication with a central monitoring station 49 (also referred to as central monitoring center) via one or more data or communication networks 52, such as the Internet (or the phone system or cellular communication system being examples of others). The intrusion detection panel 38 receives signals from the plural detectors/sensors 20, which send to the intrusion detection panel 38 information about the status of the monitored premises.

Sensor/detectors may be hardwired or communicate with the intrusion detection panel 38 wirelessly. Some or all of sensor/detectors 20 communicate wireless with the intrusion detection panel 18 and with the gateways. In general, detectors sense glass breakage, motion, gas leaks, fire, and/or breach of an entry point, and send the sensed information to the intrusion detection panel 38. Based on the information received from the detectors 20, the intrusion detection panel 38 determines whether to trigger alarms, e.g., by triggering one or more sirens (not shown) at the premises 36 and/or sending alarm messages to the monitoring station 20. A user may access the intrusion detection panel 38 to control the intrusion detection system, e.g., disarm, arm, enter predetermined settings, etc.

Also shown in FIG. 3 is a dispatch center 29 that in this example is part of the central monitoring station 49. The dispatch center 29 includes personnel stations (not shown), server(s) systems 14 running a program that populates a database (not shown) with historical data. The central monitoring station 49 also includes the sensor based state prediction system 50. An exemplary intrusion detection panel 38 includes a processor and memory, storage, a key pad and a network interface card (NIC) coupled via a bus (all not shown).

Figure 4:
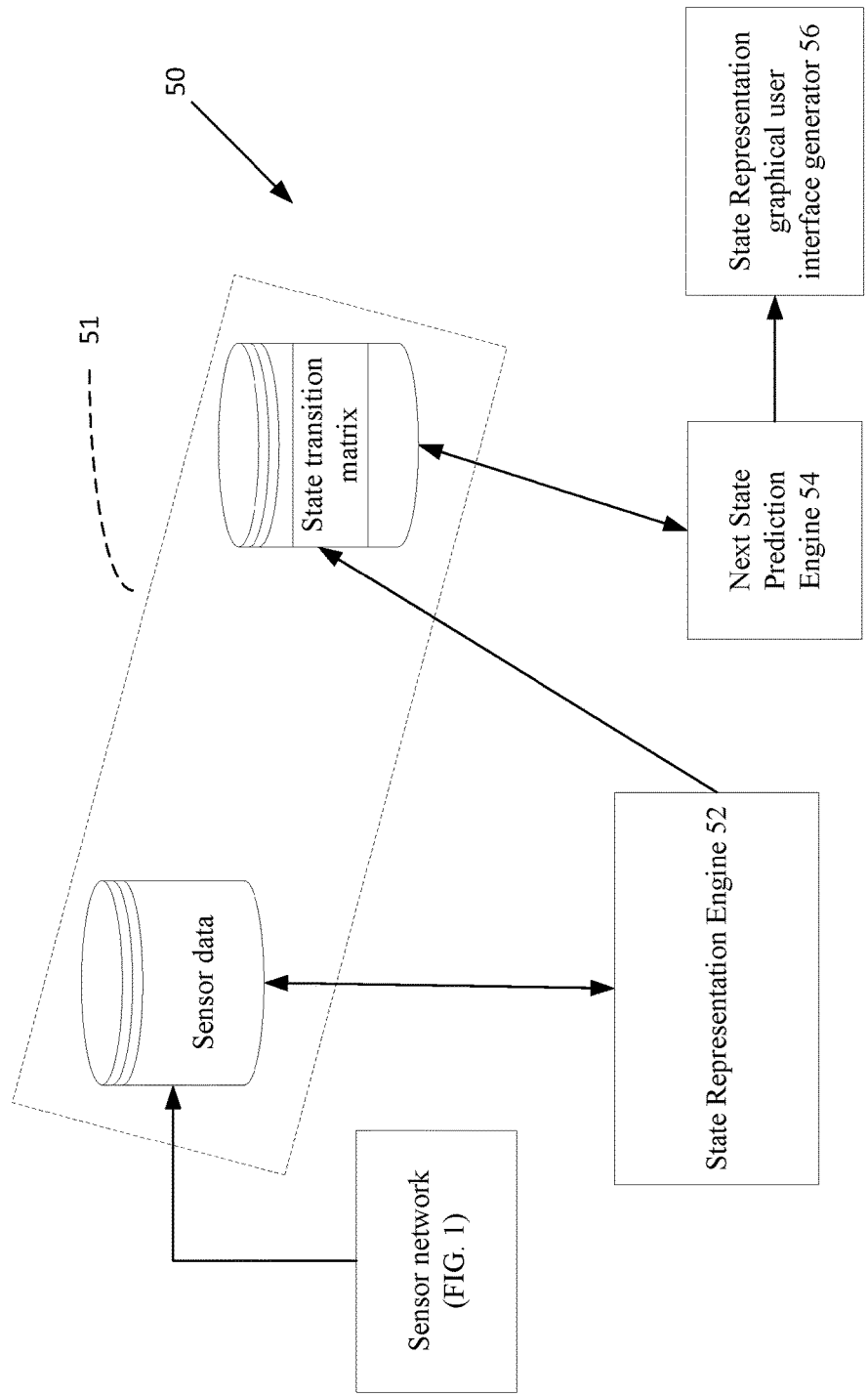
FIG. 4 is a block diagram of a state based prediction system.

Referring now to FIG. 4, a prediction system 50 is shown. The prediction system 50 executes on one or more of the cloud-based server computers and accesses database(s) 51 that store sensor data and sensor state data in a state transition matrix, with the sensor data stored and accessible on an individually identifiable sensor device 20 or 20'. In some implementations, dedicated server computers could be used as an alternative. Aspects of the prediction system are disclosed in US Published Application US-2017-0092108-A1, published March 230, 2017, the entire contents of which are incorporated herein by reference.

The sensor based state prediction system 50 disclosed herein is modified to consider state transitions with respect to individually identifiable sensor devices 20 or 20'. The sensor based state prediction system 50 includes a State Representation Engine 52. The State Representation Engine 52 executes on one or more of the servers described above and interfaces on the servers receive sensor signals from a large plurality of sensors deployed in various premises throughout an area. These sensor signals have sensor values that represent a data instance for the particular sensors over time.

While in the above mentioned published application sensor data and the other monitoring data are collected together to represent a data instance for a particular area of a particular premises in a single point in time, and the State Representation Engine in the published application takes these granular values and converts the values into a semantic representation. In this engine 52 sets of sensor values for each particular sensor at points in time are collected assigned labels, e.g., "State-1, sensor XX, YY"; "State-n, sensor XX, YY"; etc. As the data is collected continuously, this Engine 52 works in an unsupervised manner, as discussed below to determine various safe and drift states with respect to the sensors that may exist in the premises.

As different states are captured, this engine 52 also determines state transition metrics that are stored in the form a state transition matrix. A simple state transition matrix has all states for all sensors in its rows and columns capturing the operating behavior of the sensors for a given system. State transitions occur either over time or due to events, such as sensor failures. Hence, the state transition metrics are captured using both time and events. A state is a representation of a group of one sensor or a group of more than one sensor grouped according to a clustering algorithm.

The State transition matrix is a data structure that stores how many times the sensors changed from State_i, e.g., a normal state to State_j, e.g., a failure state. The State transition matrix thus stores "knowledge" that the sensor based state prediction system 50 captures and which is used to determine predictions of the behavior of the sensor. The State transition matrix is accessed by the Next prediction engine to make decisions and trigger actions by the sensor based state prediction system 50.

Unsupervised learning e.g., clustering is used to group sensor readings into states and conditions over a period of time that form a time trigger state and over events to form an event trigger state. Used to populate the state transition matrix per sensor.

An exemplary simplified depiction for explanatory purposes of a State transition matrix is set out below:

| | | Instance | | | |
|---|---|---|---|---|---|
| State transition | State transition | State transition | State transition | State transition | State transition |
| x, y | x, y | x, y | x, y | x, y | x, y |
| x, y | x, y | x, y | x, y | x, y | x, y |
| x, y | x, y | x, y | x, y | x, y | x, y | where columns in the State transition matrix are "state transitions" expressed as a listing by instance with pointer to the state time and event trigger tables. Entries x,y in cells of the State transition matrix are pointers that corresponds to trigger tables that store the number of time periods and events respectively for each particular cell of the State transition matrix.

The State time trigger is depicted below. The State time trigger tracks the time periods t1 ... t8 for each state transition corresponding to the number x in each particular cell.

| t1 | t2 | t3 | |
|---|---|---|---|
| | | Instance | |
| State transition 1 | State transition 2 | State transition 3 | *** |
| 1 | 1 | 1 | *** |
| 1 | 1 | 1 | *** |
| t1 t5 | t2 t3 | t4 t7 t8 | *** |

State event trigger tracks the events E1 ... E2 for each state transition corresponding to the number y in each particular cell (if any).

| e1 | e2 | e3 | |
|---|---|---|---|
| | | Instance | |
| State transition 1 | State transition 2 | State transition 3 | *** |
| | | E2 | *** |
| | | E2 | *** |
| E1 | E1 | E3 | *** |

The State Representation Engine 52 in addition to populating the State transition matrix, also populates a State time trigger that is a data structure to store, the time value spent in each state and a distribution of the time duration for each state. Similar to the State transition matrix, the State time trigger also encapsulates the behavior knowledge of the environment. State transitions can be triggered using these values.

The State Representation Engine 52 also populates a State event trigger. The State event trigger is a data structure to store, event information. An example of an event can be sensor on a door sensing that a door was opened. There are many other types of events. This data structure captures how many times such captured events caused a state transition.

The State Representation Engine 52 populates the State Transition matrix and the State Time and State triggers, which together capture metrics, which provide a Knowledge Layer of the operational characteristics of the sensor.

The sensor based state prediction system 50 also includes a Next State Prediction Engine 54. The Next State Prediction Engine 54 predicts an immediate Next state of the sensor device, based on the state transition matrix. The Next State Prediction Engine 54 predicts if the sensor device will be in either a normal or a drift or a fail state over a time period in the future. The term "future" as used herein refers to a defined window of time in the future, which is defined so that a response team has sufficient time to address a condition that is predicted by the Next State Prediction Engine 54 that may occur in the sensor to restore the state of the sensor to a normal state. The Next State Prediction Engine operates as a Decision Layer in the sensor.

The sensor based state prediction system 50 also includes a State Representation graphical user interface generator 56. State Representation graphical user interface generator 56 provides a graphical user interface that is used by the response team to continuously monitor the state of the sensor. The State Representation graphical user interface generator 56 receives data from the Next State Prediction Engine 54 to graphically display whether the sensor is either in the safe state or the drifting state. The State Representation graphical user interface generator 56 operates as an Action Layer, where an action is performed based on input from Knowledge and Decision Layers.

The sensor based state prediction system 50 applies unsupervised algorithm learning models to analyze historical and current sensor device 20, 20' data records from one or more customer premises and generates a model that can predict Next patterns, anomalies, conditions and events over a time frame that can be expected for sensor devices 20, 20' at a customer site. The sensor based state prediction system 50 produces a list of one or more predictions that may result in on or more alerts being sent to one more user devices as well as other computing system, as will be described. The prediction system 50 uses various types of unsupervised machine learning models including Linear/Non-Linear Models, Ensemble methods etc.

The prediction system 50 is one example of a prediction system 51 that is used in a sensor failure prediction system 120 (FIG. 7) for detecting system behavior that is a potential precursor to a false alarm condition. Other examples of prediction systems could be used. Using the sensor failure prediction system 120, building owners can be notified in advance that their intrusion detection system (or fire, surveillance, access system or integrated systems comprising one or more of these systems) is acting in a manner that suggests certain preventative maintenance is required. In particular, the sensor failure prediction system 120 is configured to predict and provide a mechanism to minimize occurrences of false alarm conditions.

Figure 5:
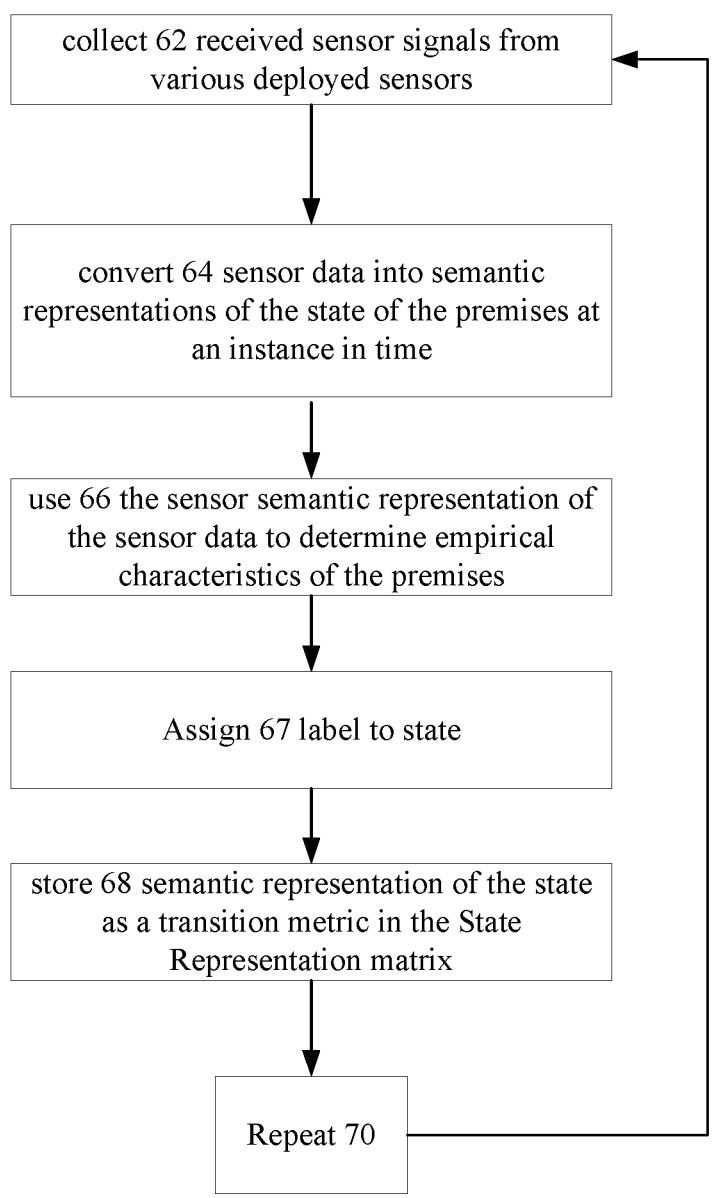
FIG. 5 is a flow diagram of a state representation engine.

Referring now to FIG. 5, the processing 60 for the State Representation Engine 52 is shown. The State Representation Engine 55 collects 62 (e.g., from the databases 51 or directly from interfaces on the servers) received sensor signals from a large plurality of sensors deployed in various sensor throughout an area that is being monitored by the sensor based state prediction system 50. The sensor data collected from the sensor device 20, 20', includes collected sensor monitoring data values and metadata regarding the sensor, e.g., type, model, part no., age, etc.

Sensor signals provided from sensor devices have sensor values that represent a data instance for a particular area of a particular premises in a single point in time. The State Representation Engine 52 converts 64 this sensor data into semantic representations of the state of the premises and more particularly the state of the sensor devices 20, 20' at instances in time. The State Representation Engine 52 uses 66 the converted sensor semantic representation of the sensor data collected from the sensors to determine the empirical characteristics of the sensors. The State Representation Engine 52 assigns 67 an identifier to the state of the sensors. Any labelling can be used. Labelling is typically consecutively identified, such that a state for a magnetic door sensor is semantically described as follows:

State 1: interior door 16, magnetic door sensor: open
current time: <date> <time>

The semantic description includes the identifier "State 1" as well as semantic descriptions of the sensor (a magnetic door sensor on interior door number 16,), the values "open" and date <date> and time <time>.

The State Representation Engine 52 determines an abstraction of a collection of "events" i.e., the sensor signals as state. The state thus is a concise representation of the underlying behavior information of the sensors being monitored, described by time and data and various sensor values at that point in time and at that date.

The semantic representation of the state is stored 68 by the State Representation Engine 52 as state transition metrics in the State Representation matrix. Over time and days, as the sensors produce different sensor values, the State Representation Engine 55 determines different states and converts these states into semantic representations that are stored the state transition metrics in the matrix, e.g., as in a continuous loop 70.

The state representation engine 52, converts raw values into state definitions and assigns (labels) each with a unique identifier for each state, as discussed above. As the sensor devices 20, 20' are operated over a period of time, the Next transition matrix, the state time trigger matrix and the state event trigger matrix are filled.

The state representation engine 52, adds to the state transition matrix entries that corresponds to transitions, in which as sensor moved from state 1 to state 2. The state representation engine 52, also adds to the state transition matrix in that entry, an indicator that the transition was "time trigger," causing the movement, and thus the state representation engine 52 adds an entry in state time trigger matrix. The state representation engine 52, thus co-ordinates various activities inside the premises under monitoring and captures/determines various operating characteristics of sensors in the premises.

Figure 6:
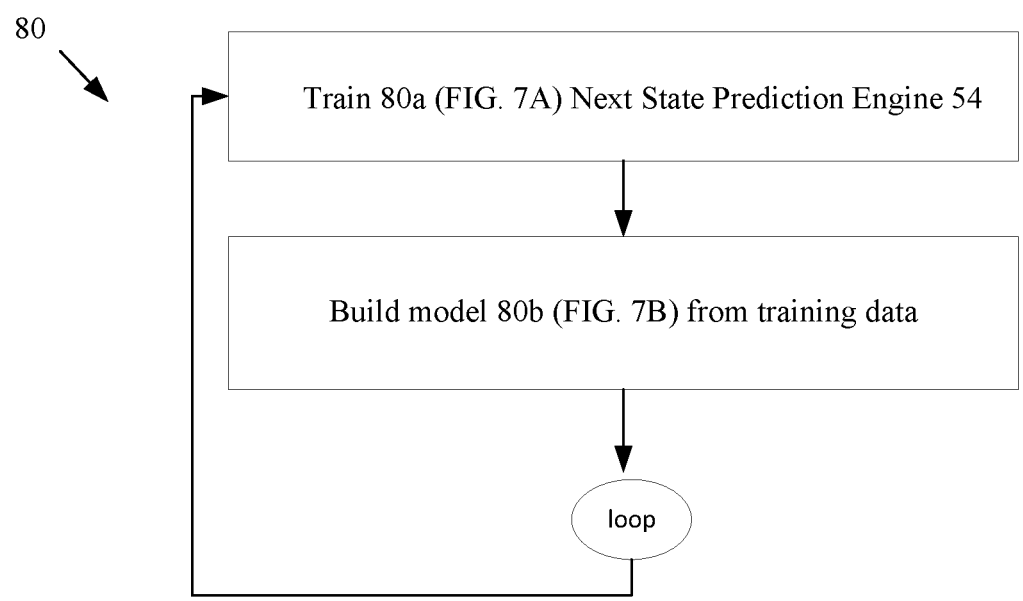
FIG. 6 is a flow diagram of state prediction system processing.

Referring now to FIG. 6 processing 80 for the Next State Prediction Engine 54 is shown. This processing 80 includes training processing 80a (FIG. 6A) and model building processing 80b (FIG. 7B), which are used in operation of the sensor based state prediction system 50.

Figure 6A:
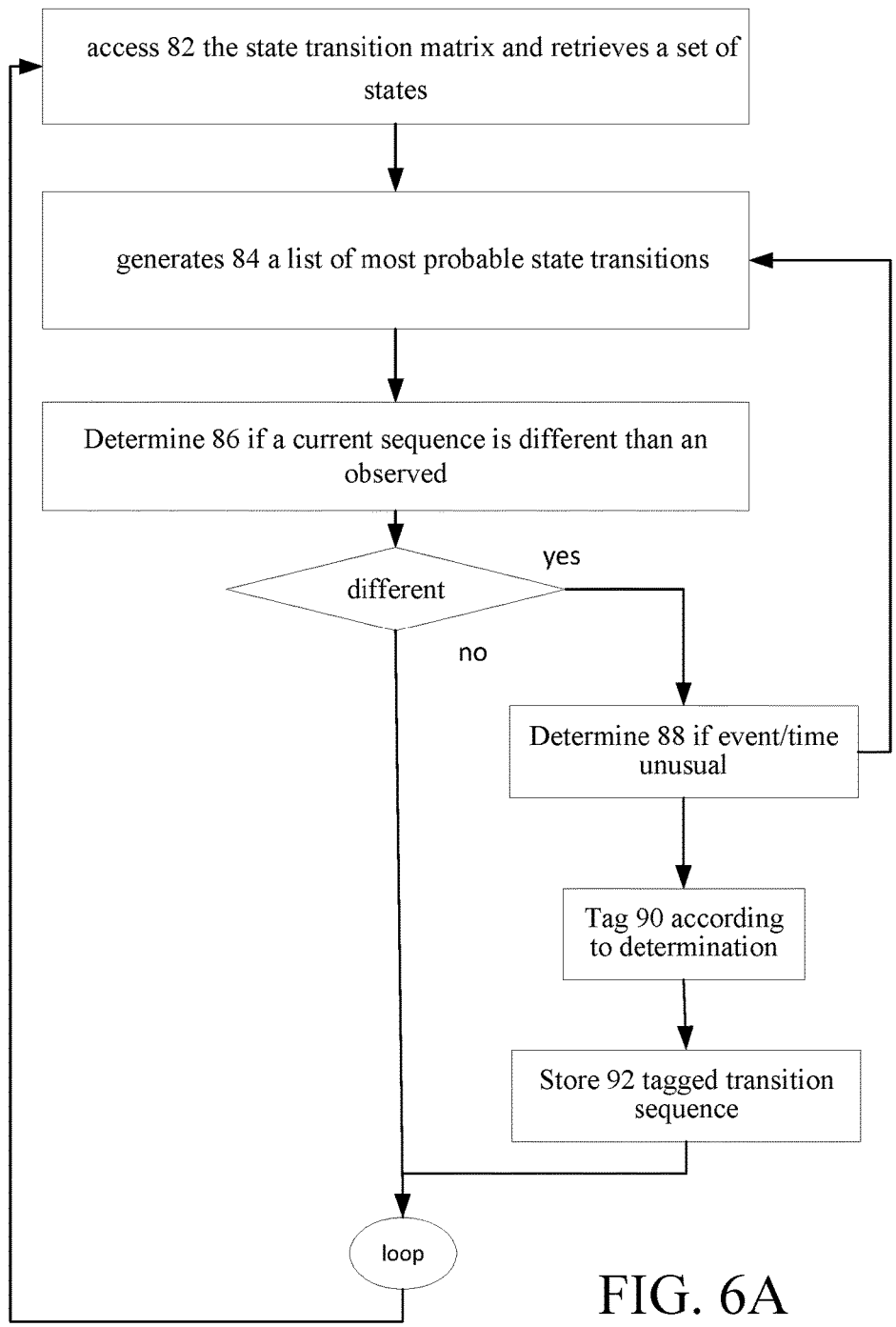
FIG. 6A is a flow diagram of training process for a Next state predictor engine that is part of the sensor based state prediction system.

Referring now to FIG. 6A, the training processing 80a that is part of the processing 80 for the Next State Prediction Engine 54 is shown. In FIG. 6A, training processing 80' trains the Next State Prediction Engine 54. The Next State Prediction Engine 54 accesses 82 the state transition matrix and retrieves a set of states from the state transition matrix. From the retrieved set of states, the Next State Prediction Engine 54 generates 84 a list of most probable state transitions for a given time period, the time period can be measured in minutes, hours, days, weeks, months, etc. For example, consider the time period as a day. After a certain time period of active usage, the sensor based state prediction system 50, through the state representation engine 52, has acquired knowledge states s1 to s5.

From the state transition matrix, the system uses the so called "Markov property" to generate state transitions. As known, the phrase "Markov property" is used in probability and statistics and refers to the "memoryless" property of a stochastic process.

From the state transition matrix using the so called "Markov property" the system generates state transition sequences, as the most probable state sequences for a given day.

An exemplary fictitious sequence is shown below:
s1 s2 s4 s5
s2 s2 s4 s5

The Next State Prediction Engine 54 determines 86 if a current sequence is different than an observed sequence in the list above. When there is a difference, the Next State Prediction Engine 54 determines 88 whether something unusual has happened in sensor devices 20, 20' being monitored or whether the state sequence is a normal condition of the sensor devices 20, 20' being monitored.

With this information the Next State Prediction Engine 54 90 these state transitions as "safe" or "drift/fail state" transitions. Either the Next State Prediction Engine 54 or manual intervention is used to label either at the state transition level or the underlying sensor value levels those state transitions. A first column can be the sensor ID, a second column (or sets of columns a value or sets of values and a last column is the label. For example, "G" can be used to indicate green, e.g., a normal operating state, "Y" is used to indicate yellow, e.g., an abnormal or drift state, and "R" a fail state. This data and states can be stored in the database 51 and serves as training data for a machine learning model that is part of the Next State Recommendation Engine 54.

Figure 6B:
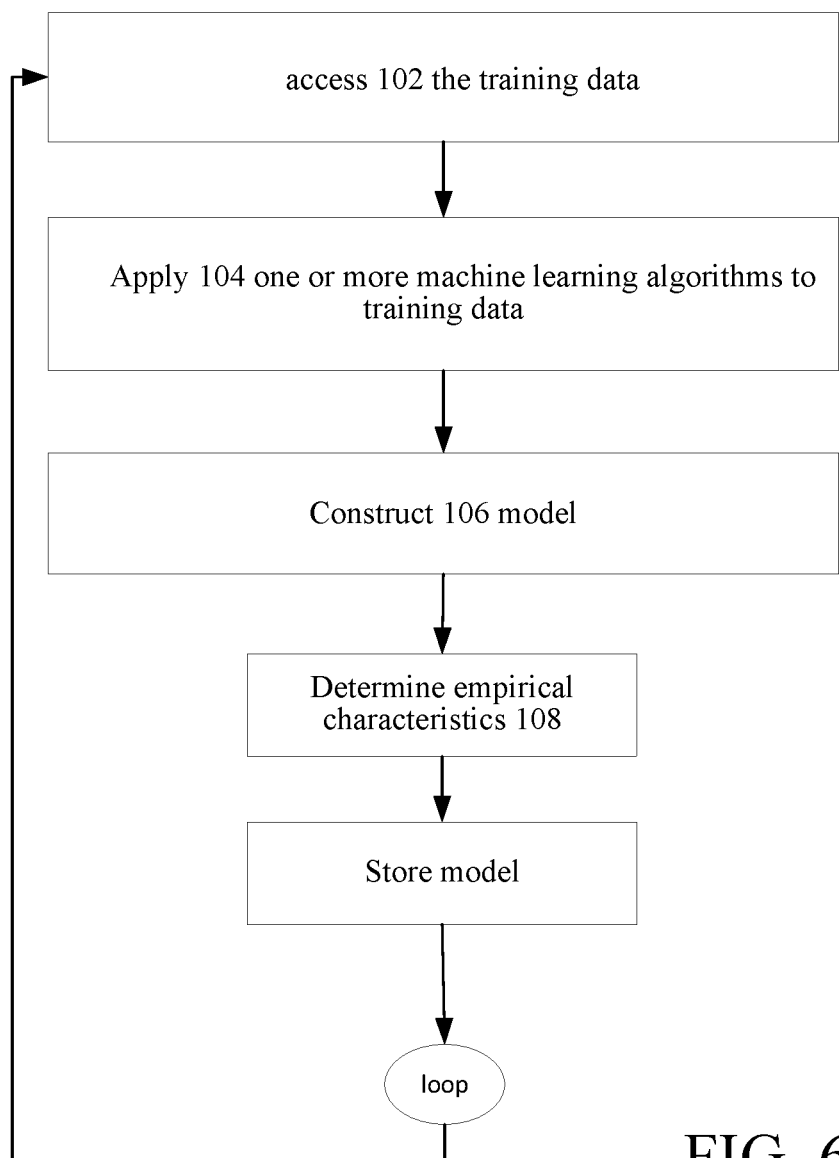
FIG. 6B is a flow diagram of a Next state predictor engine model building process.

Referring now to FIG. 6B, the model building processing 80b of the Next State Recommendation Engine 54 is shown. The model building processing 80b uses the above training data to build a model that classify a system's state into either a safe state or an unsafe state. Other states can be classified. For example, three states can be defined, as above, "G Y R states" or green (safe state) yellow (drifting state) and red (unsafe state). For ease of explanation two states "safe" (also referred to as normal) and "unsafe" (also referred to as drift) are used. The model building processing 80b accesses 102 the training data and applies 104 one or more machine learning algorithms to the training data to produce the model that will execute in the Next State Recommendation Engine 54 during monitoring of systems. Machine learning algorithms such as Linear models and Non-Linear Models, Decision tree learning, etc., which are supplemented with Ensemble methods (where two or more models votes are tabulated to form a prediction) and so forth can be used. From this training data and the algorithms, the model is constructed 106.

Figure 7:
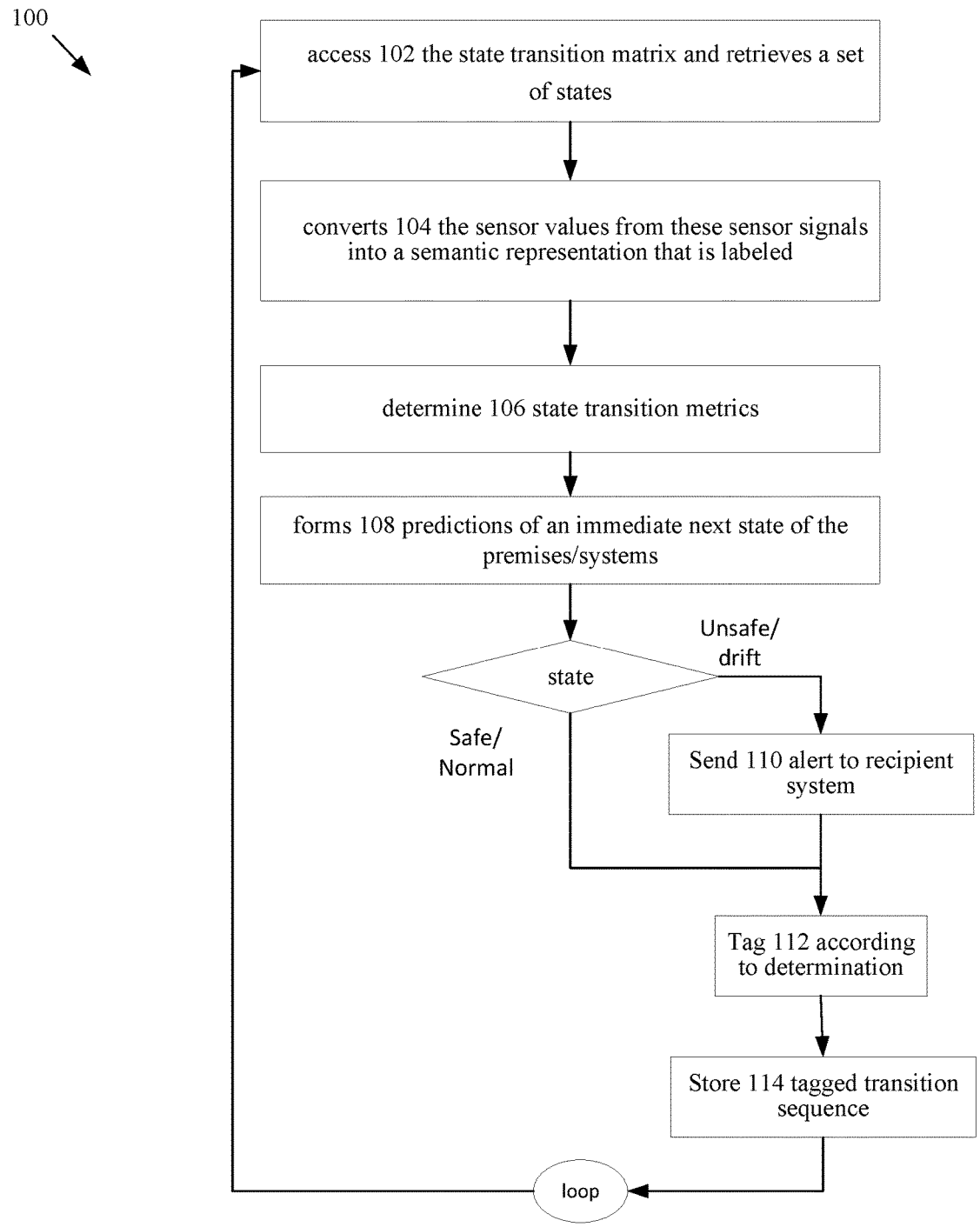
FIG. 7 is a flow diagram depicting operational processing of the state predictor.

Referring now to FIG. 7, operational processing 100 of the sensor based state prediction system 50 is shown. The sensor based prediction system 50 receives 102 (by the State Representation Engine 52) sensor signals from a large plurality of sensors deployed in various sensor devices 20, 20' throughout an area being monitored. The State Representation Engine 52 converts 104 the sensor values from these sensor signals into a semantic representation that is identified, as discussed above. As the data is collected continuously, this Engine 52 works in an unsupervised manner to determine various states that may exist in sensor data being received from the individual sensor devices 20, 20' installed in a given premises or group of premises. As the different states are captured, the State Representation Engine 52 also determines 106 state transition metrics that are stored in the state transition matrix using both time and events populating the State time trigger and the State event trigger, as discussed above. The State transition matrix is accessed by the Next prediction engine 54 to make decisions and trigger actions by the sensor based state prediction system 50.

The Next State Prediction Engine 54 receives the various states (either from the database and/or from the State Representation Engine 52 and forms 108 predictions of an immediate Next state of the sensor devices 20, 20'/systems based the state data stored in the state transition matrix. For such states the Next State Prediction Engine 54 predicts if the sensor devices 20, 20' will be in either a safe state or a drift state over a time period in the Next as discussed above.

The sensor based state prediction system 50 also sends 110 the predictions to the State Representation engine 56 that generates a graphical user interface to provide a graphical user interface representation of predictions and states of various sensor devices 20, 20'/systems. The state is tagged 112 and stored 114 in the state transition matrix.

The sensor based state prediction system 50 using the State Representation Engine 52 that operates in a continuous loop to generate new states and the Next State Prediction Engine 54 that produces predictions together continually monitor the sensor devices 20, 20'/systems looking for transition instances that result in drift in states that indicate potential problem conditions. As the sensors in the premises being monitored operate over a period of time, the state transition matrix, the state time trigger matrix and the state event trigger matrix are filled by the state representation engine 52 and the Next State Prediction Engine 54 processing 80 improves on predictions.

The sensor based state prediction system 50 thus determines the overall state of the sensor devices 20, 20' and the systems by classifying into a normal or "safe" state and the drift or unsafe state. Over a period of time, the sensor based state prediction system 50 collects information about the sensor devices 20, 20' and the sensor based state prediction system 50 uses this information to construct a mathematical model that includes a state representation, state transitions and state triggers. The state triggers can be time based triggers and event based triggers, as shown in the data structures above.

Describes are techniques for detecting changes in operational characteristics of sensor devices by collecting sensor information from deployed sensor devices. The collected sensor information includes sensor data and sensor device metadata. The sensor device metadata includes data about the sensor, such as a sensor identification value that can be used to retrieve other sensor metadata such as the age of the sensor, as well as sensor type, manufacturer, model, etc. These techniques continually analyze the collected sensor information to detect changes in the operational characteristics of a sensor device in the group of sensor devices. Upon detection of changes in the operational characteristics of the sensor, the techniques access a database that stores maintenance organization contact information to send a request for maintenance on the sensor device to the maintenance organization contact. In some implementations the age, type, model, etc. of the sensor with the detected changes is used to find other similar devices that could be replaced during a maintenance appointment scheduled by the request.

Figure 8:
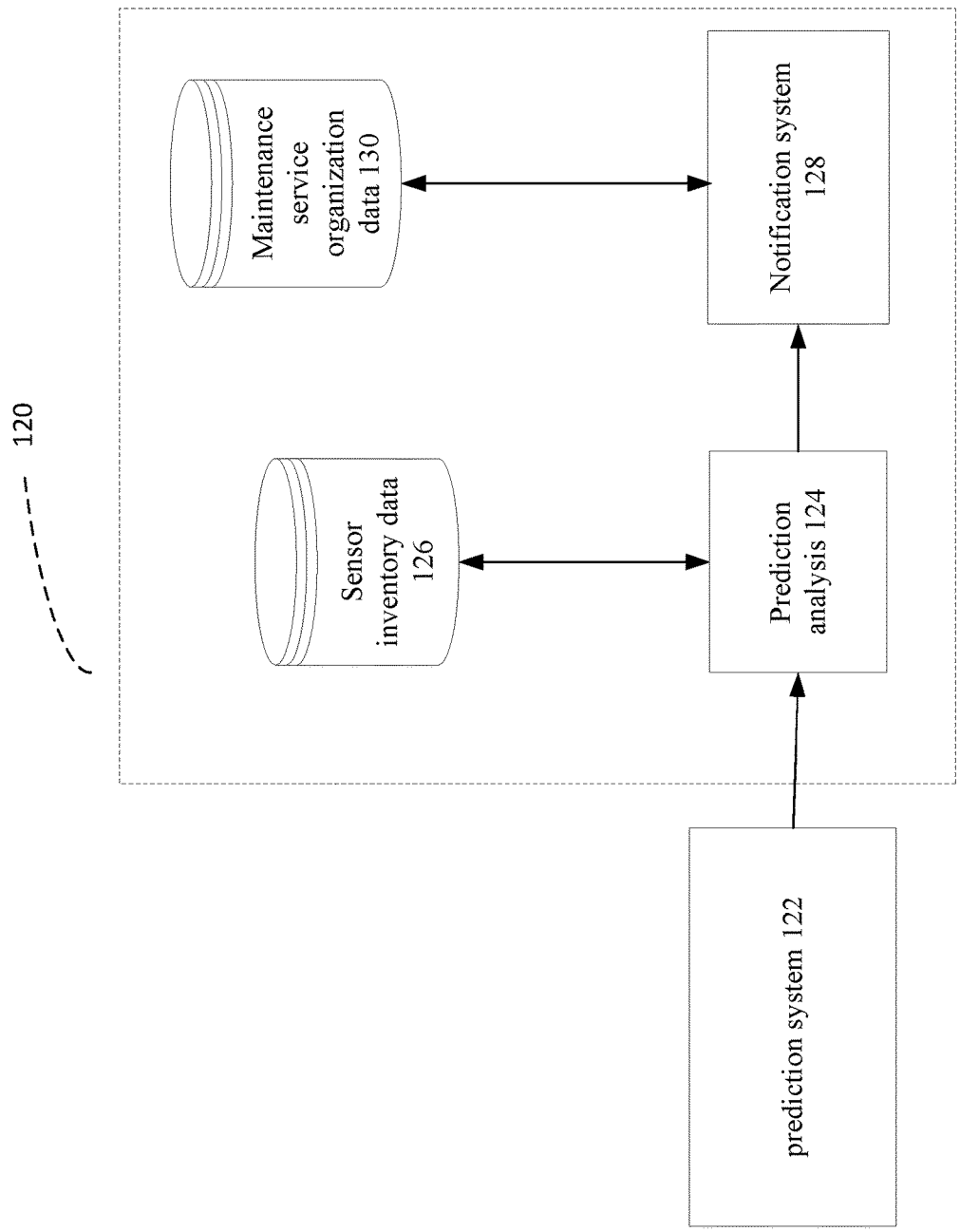
FIG. 8 is a block diagram of a sensor failure prediction system.
Figure 8A:
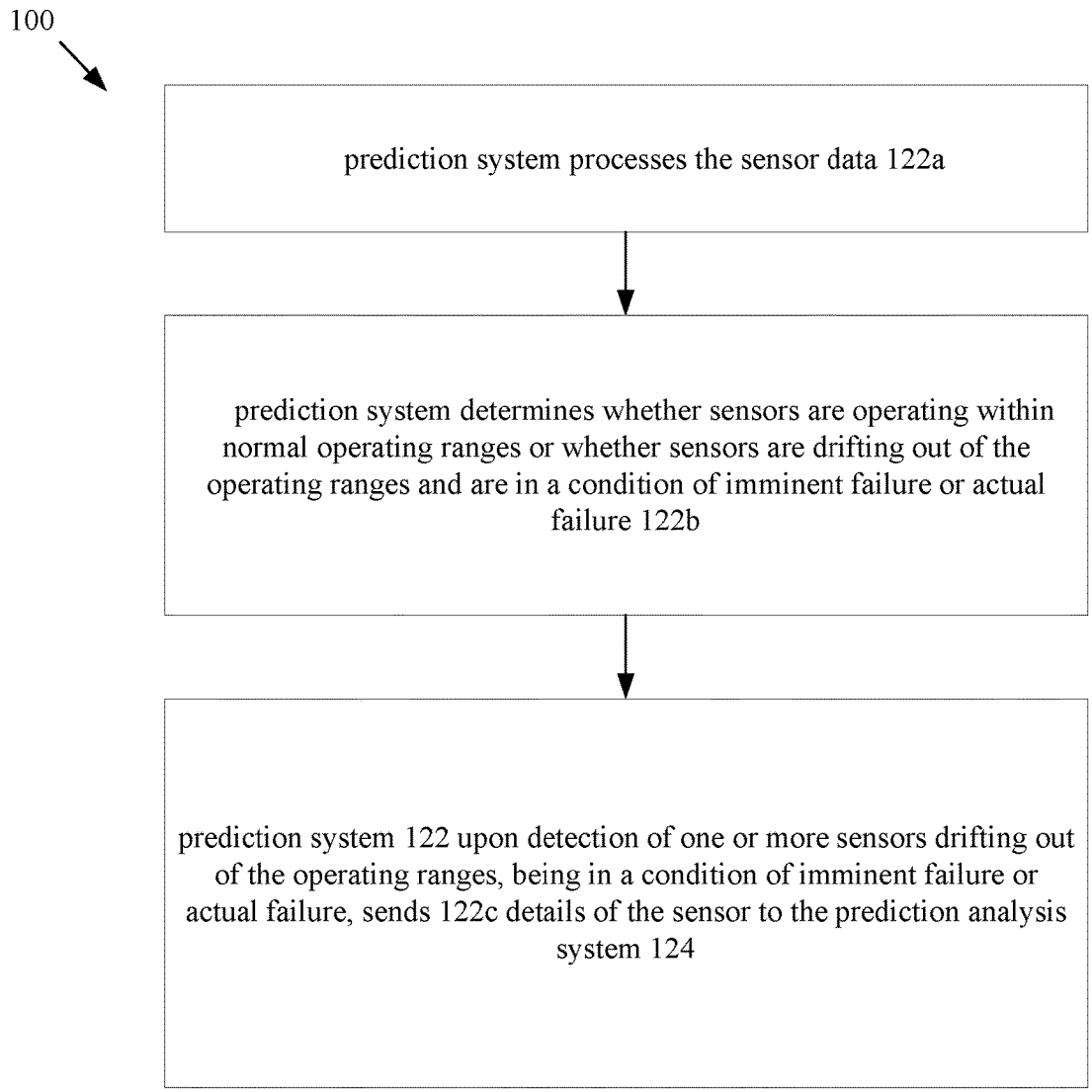
FIGS. 8A-8C are flow diagram of operational processing by the sensor failure prediction system of FIG. 7.
Figure 8B:
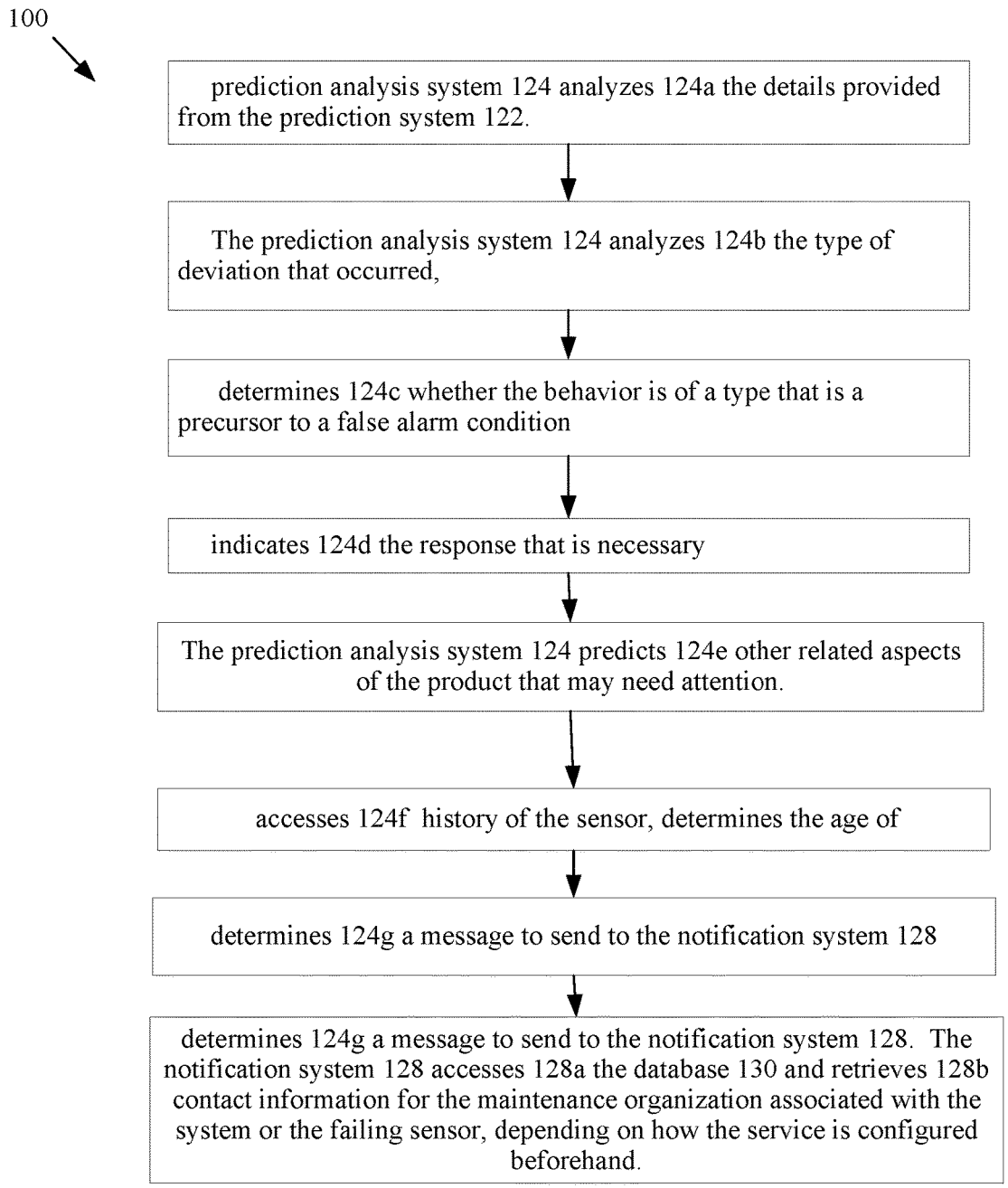
Figure 8C:
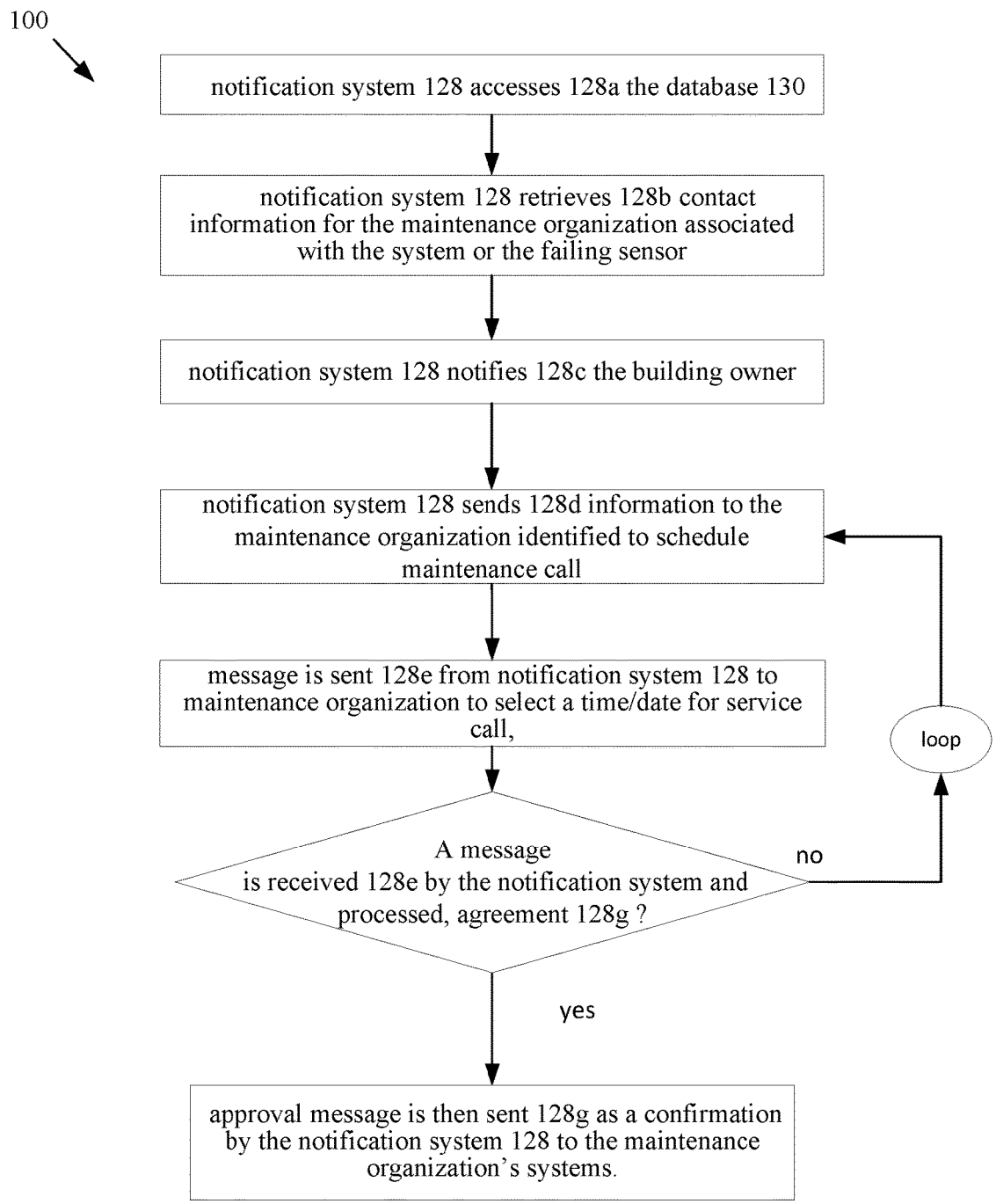

Referring now to FIG. 8, the sensor failure prediction system 120 includes a prediction system 122 that uses data intelligence to predict anomalous behavior in sensor devices. While aspects of the processing in the sensor failure prediction system 120 can be expanded to entire systems, the focus herein will be primarily on sensor devices. The prediction system 122 tracks normal product behavior that is derived from past product behavior against current product behavior at a protected premises. One example of the prediction system 122 is the sensor based state prediction system 50 of FIGS. 4-7B, discussed above. Other the prediction systems can be used. The past behavior sets a standard by which the security product, e.g., sensor device is measured against.

The sensor failure prediction system 120 also includes a prediction analysis system 124 that receives messages regarding one or more determined predictions of a sensor device failure from the prediction system 122. When a deviation from a standard norm is detected in the security product's, e.g., sensor device's operation, that resulted in a prediction message, the sensor failure prediction system 120 analyzes the type of deviation that occurred, determines whether the behavior is of a type that is a precursor to a false alarm condition, and indicates the response that is necessary.

The sensor failure prediction system 120 also includes or accesses a data repository 126 that stores information regarding installed sensor devices in premises. In particular, the stored information includes information such as installation/manufacture date, etc. The prediction analysis 124 access information regarding the sensor device or devices involved in the prediction, determines potential effects on assertion of false alarm conditions and in some instances predicts other related aspects of the security product that may need attention.

For example, if a magnetic door sensor is exhibiting aberrant behavior and is predicted to fail, the sensor failure prediction system 120 accesses the data repository to determine the age of that sensor. The sensor failure prediction system 120 also accesses the data repository to determine the existence of as well as location of all other similar sensors in the building that are the same type and age as the failing one.

The sensor failure prediction system 120 includes a notification system 128 that contacts an administrative function at the premises regarding the prediction. In addition, the system can be "closed-loop" by accessing a maintenance service database 130 for automatically sending all of this information to a maintenance organization and scheduling time for the maintenance to be conducted.

Using such a closed-loop approach, a building owner is notified that there was a problem with their security product, and the maintenance organization has been notified and scheduling time for the maintenance to be conducted has been set, so that the failed sensor device as well as like sensor devices will be automatically serviced and/replaced. Therefore, when a security issue arises, the building owner will have a greater confidence that it is an actual security event rather than a false alarm.

Referring now to FIG. 9, processing 150 by the system 120 for detecting equipment, more specifically, sensor equipment failure, and evaluating such a failure with respect to maintenance is shown. The prediction system 122 processes 122a the sensor data and determines 122b whether sensors are operating within normal operating ranges or whether sensors are drifting out of the operating ranges and are in a condition of imminent failure or actual failure. The prediction system 122 upon detection of one or more sensors drifting out of the operating ranges, being in a condition of imminent failure or actual failure, sends 122c details of the sensor to the prediction analysis system 124. The prediction analysis system 124 analyzes 124a the details provided from the prediction system 122. The prediction analysis system 124 analyzes 124b the type of deviation that occurred, determines 124c whether the behavior is of a type that is a precursor to a false alarm condition, and indicates 124d the response that is necessary.

The prediction analysis system 124 predicts 124e other related aspects of the product that may need attention. The prediction analysis system 124 accesses 124f the complete history of the sensor and determines the age of that sensor by accessing the database 126 to obtain records of all sensors in the premises that are the same type, same manufacture/model, and similar age as the failing one. Age can be referenced either from data of manufacture or date of installation or date of purchase, etc. All that is necessary is that whatever definition of "age" is used, is consistently applied by the analysis system 124. The prediction analysis system 124 determines 124g a message to send to the notification system 128. Similar age can be a range that is pre-established based on the device type. Thus, similar age would be in a range that is fixed percentage of the age of the device in the drift state. On one end of the range, all devices that are older than the device in the drift state would be considered candidates for replacement and on the other end all devices within 80% or 90% of the age of the device in the drift state would be considered candidates for replacement. Other values could be used, the basis for exact values will vary from device type to device type taking into consideration other factors such as cost of the device, cost of replacement and cost of a service call, etc.

The notification system 128 accesses 128a the database 130 and retrieves 128b contact information for the maintenance organization associated with the system or the failing sensor, depending on how the service is configured beforehand. The notification system 128 notifies 128c the building owner of all this information and in addition, the notification system 128 automatically sends 128d all of this information to the maintenance organization identified and schedules time for the maintenance to be conducted. A message is sent 128e from notification system 128 to the maintenance organization to select a time/date for a service call, that selection is executed by maintenance organization systems and those systems return a message with the selected time/date. This message is received 128e by the notification system 128 and processed 128f to obtain agreement 128g with the notification system 128 for time/date generally upon approval (either automatically or more likely upon approval of the building owner). An approval message is then sent 128g as a confirmation by the notification system 128 to the maintenance organization's systems.

Using such a closed loop system, a building owner need not be directly involved with the problem with their security product as the problem would be automatically notified to a maintenance organization that would fix the problem as well as related problems. Therefore, when a security alert is issued, the building owner will have a greater confidence that the alert is an actual security event rather than a false alarm.

The prediction analysis 124 and the notification system 128 can be part of the prediction system 122 that conducts an analysis of sensor signals from deployed individual sensors to detect one or more drift states that predict potential sensor equipment failure.

Various combinations of the above described processes are used to implement the features described.

Servers interface to the sensor based state prediction system 50 via a cloud computing configuration and parts of some networks can be run as sub-nets. In some embodiments, the sensors provide in addition to sensor data, detailed additional information that can be used in processing of sensor data evaluate. For example, a motion detector could be configured to analyze the heat signature of a warm body moving in a room to determine if the body is that of a human or a pet. Results of that analysis would be a message or data that conveys information about the body detected. Various sensors thus are used to sense sound, motion, vibration, pressure, heat, images, and so forth, in an appropriate combination to detect a true or verified alarm condition at the intrusion detection panel.

Recognition software can be used to discriminate between objects that are a human and objects that are an animal; further facial recognition software can be built into video cameras and used to verify that the perimeter intrusion was the result of a recognized, authorized individual. Such video cameras would comprise a processor and memory and the recognition software to process inputs (captured images) by the camera and produce the metadata to convey information regarding recognition or lack of recognition of an individual captured by the video camera. The processing could also alternatively or in addition include information regarding characteristic of the individual in the area captured/monitored by the video camera. Thus, depending on the circumstances, the information would be either metadata received from enhanced motion detectors and video cameras that performed enhanced analysis on inputs to the sensor that gives characteristics of the perimeter intrusion or a metadata resulting from very complex processing that seeks to establish recognition of the object.

Sensor devices can integrate multiple sensors to generate more complex outputs so that the intrusion detection panel can utilize its processing capabilities to execute algorithms that analyze the environment by building virtual images or signatures of the environment to make an intelligent decision about the validity of a breach.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The stored program instruction may include one or more authentication processes for authenticating one or more users. The program instructions stored in the memory of the panel may further store software components allowing network communications and establishment of connections to the data network. The software components may, for example, include an internet protocol (IP) stack, as well as driver components for the various interfaces. Other software components suitable for establishing a connection and communicating across network will be apparent to those of ordinary skill.

Program instructions stored in the memory, along with configuration data may control overall operation of the system. Servers include one or more processing devices (e.g., microprocessors), a network interface and a memory (all not illustrated). Servers may physically take the form of a rack mounted card and may be in communication with one or more operator terminals (not shown). An example monitoring server is a SURGARD™ SG-System III Virtual, or similar system.

The processor of each monitoring server acts as a controller for each monitoring server, and is in communication with, and controls overall operation, of each server. The processor may include, or be in communication with, the memory that stores processor executable instructions controlling the overall operation of the monitoring server. Suitable software enable each monitoring server to receive alarms and cause appropriate actions to occur. Software may include a suitable Internet protocol (IP) stack and applications/clients.

Each monitoring server of the central monitoring station may be associated with an IP address and port(s) by which it communicates with the control panels and/or the user devices to handle alarm events, etc. The monitoring server address may be static, and thus always identify a particular one of monitoring server to the intrusion detection panels. Alternatively, dynamic addresses could be used, and associated with static domain names, resolved through a domain name service.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A non-transitory computer program product tangibly stored on a non-transitory computer readable hardware storage device, the computer program product for detecting changes in operational characteristics of a group of sensor devices deployed in a system, the computer program product comprising instructions to cause a processor to:
    collect sensor information from the group of sensor devices with the collected sensor information including sensor operational data and sensor device metadata;
    execute one or more unsupervised learning models to continually analyze the collected sensor information to detect changes in operational characteristics of a sensor device in the group of sensor devices, with the changes correlated to an imminent potential failure of the sensor device;
    produce sequences of sensor state transitions;
    detect during the continual analysis of the sensor data that the detected changes in the operational characteristics correspond to one or more of the sequences of sensor state transitions being a drift sequence, by correlating the detected drift sequence to a stored determined condition to determine whether a potential false alarm could occur by the sensor device being in the drift sequence;
    upon detection of a change in the operational characteristics of the sensor device that would indicate the potential failure or occurrence of a potential false alarm, access a database that stores maintenance organization contact information;
    generate based on the detected changes and the access to the database a request for maintenance on the sensor device; and
    send the request to the maintenance organization contact.

2. The non-transitory computer program product of claim 1 wherein the sensor data is collected continuously.

3. The non-transitory computer program product of claim 1 wherein for the produced sequences of sensor state transitions the instructions determine from state transition metrics that are stored in a state transition matrix, occurrence of a drift condition for the sensor device in the drift condition;
    determine from the sensor device metadata, age of the sensor device in the drift condition; and
    access a database by sensor device type to retrieve metadata on sensor devices of a type of the one or more sensor devices in the drift condition, and having an age approximate to the determined age of the sensor device.

4. The non-transitory computer program product of claim 1 wherein for the produced sequences of sensor state transitions the instructions generate a second request for maintenance based on the determined drift condition and the age of the sensor device, with the second request for maintenance being for one or more of the sensor devices in the group in the detected drift condition, and for those sensor devices having the approximate age.

5. A system comprising:
    a gateway to couple sensor information from plural sensor devices to a network;
    a server computer comprising processor and memory, the server computer coupled to the network;
    a storage device storing a computer program product for detecting conditions at a premises, the computer program product comprising instructions to cause the server computer to:
    collect the sensor information from the plural sensor devices, with the collected sensor information including sensor data and sensor device metadata;
    execute one or more unsupervised learning models to continually analyze the collected sensor information to produce operational state of sensor information;
    produce sequences of sensor state transitions;
    detect during the continual analysis of sensor data that one or more of the sequences of sensor state transitions corresponds to one sensor device being in a drift sequence, by correlating the drift sequence to a stored determined condition to determine whether a potential false alarm could occur by the sensor device being in the drift sequence;
    access a database that stores maintenance organization contact information; and
    generate an alert based on the drift sequence and the access to the database with the alert being a request for maintenance on the one sensor devices.

6. The system of claim 5 wherein the computer program product, further comprises instructions to:
    convert states corresponding to sensor device values into a semantic representation of a state; and
    assign a label to the semantic representation of the state.

7. The system of claim 5 wherein the system monitors a premises and is installed at the premises and further comprises:
    plural sensor devices installed at the premises.

8. The system of claim 5 wherein the system monitors a premises and is remote from the premises.

9. The system of claim 5 wherein the sensor data is collected continuously.

10. The system of claim 5 wherein for the produced sequences of sensor state transitions the instructions:
    determine from state transition metrics that are stored in a state transition matrix, occurrence of a drift condition for one or more of the sensor devices;
    determine from the sensor device metadata, age of the one or more sensor devices in the drift condition; and
    access a database by sensor device type to retrieve metadata on sensor devices of a type of the one or more sensor devices in the drift condition, and having an age approximate to the determined age of the sensor device.

11. The system of claim 10 wherein for the produced sequences of sensor state transitions the instructions generate a second set of alerts based on the determined drift condition and the age of the sensor device, a request for maintenance on the one or more of the sensor devices in the determined drift condition, and for those sensor devices having the approximate age.

12. A computer implemented method comprises:
collecting sensor information from plural sensor devices deployed in a system, with the collected sensor information including sensor data and sensor device metadata;
executing one or more unsupervised learning model to continually analyze the collected sensor information to produce operational states of sensor information;
producing sequences of sensor state transitions;
detecting during the continual analysis of sensor data that one or more of the sequences of sensor state transitions corresponds to one sensor device being in a drift sequence, by correlating the detected drift sequence to a stored determined drift sequence condition to determine whether a potential false alarm could occur by the sensor device being in the detected drift sequence;
determining from the sensor device metadata, age of the one sensor device in the detected drift sequence;
accessing a database by sensor device type to retrieve metadata on sensor devices of a type of the one sensor device in the detected drift sequence, and having an age approximate to the determined age of the sensor device;
accessing a database that stores maintenance organization contact information; and
generating an alert based on the detected drift sequence and the access to the database that stores the maintenance organization contact information, with the alert being a request for maintenance on the one sensor device.

13. The method of claim 12, further comprising:
converting states corresponding to sensor device values into a semantic representation of a state; and
assigning a label to the semantic representation of the state.

14. The method of claim 12, further comprising providing the system at a premises.

15. The method of claim 14, wherein the plural sensor devices are installed at the premises.

16. The method of claim 12, wherein the system monitors a premises and is remote from the premises.

17. The method of claim 12, wherein the sensor data is collected continuously.

18. The method of claim 12, wherein for the sequences of sensor state transitions, the method further comprises:
determining from state transition metrics that are stored in a state transition matrix, occurrence of a drift condition for one or more of the sensor devices.

19. The method of claim 12, wherein for the produced sequences of sensor state transitions, the method further comprises:
providing a second set of alerts based on the determined drift condition and the age of the sensor device, a request for maintenance on the one or more of the sensor devices in the determined drift condition, and for those sensor devices having the approximate age.

20. The method of claim 12, wherein the sensor devices are cameras.

* * * * *